United States Patent [19]

Abysov et al.

[11] Patent Number: 5,079,877
[45] Date of Patent: Jan. 14, 1992

[54] METHOD FOR MANUFACTURE OF TOOTHED ABRASIVE TOOL AND METHOD FOR FINISH-MACHINING THEREWITH

[75] Inventors: Nikolai A. Abysov; Valery A. Bezgodov; Vladimir S. Belgorodsky; Nikolai D. Plotnikov, all of Saratov, U.S.S.R.

[73] Assignee: Saratovskoe Spetsialnoe Konstruktorskoe Bjuro Zuboobrabatyvajuschikh Stankov Saratovskogo Stankostroitelnogo Proizvodstvennogo Obiedinenia, Saratov, U.S.S.R.

[21] Appl. No.: 392,944

[22] PCT Filed: Sep. 29, 1988

[86] PCT No.: PCT/SU88/00194
§ 371 Date: Jul. 28, 1989
§ 102(e) Date: Jul. 28, 1989

[87] PCT Pub. No.: WO89/05704
PCT Pub. Date: Jun. 29, 1989

[30] Foreign Application Priority Data

Dec. 24, 1987 [SU] U.S.S.R. .................. 4342343
Dec. 24, 1987 [SU] U.S.S.R. .................. 4342344

[51] Int. Cl.⁵ .................. B24B 53/06; B23F 19/00
[52] U.S. Cl. ........................ 51/287; 51/293; 51/26
[58] Field of Search .......... 51/293, 26, 287, 326, 51/206 P, 123 G, 105 GG, 5 D

[56] References Cited

U.S. PATENT DOCUMENTS

| | | | |
|---|---|---|---|
| 1,822,846 | 9/1931 | Wildhaber | 51/26 |
| 2,102,659 | 12/1937 | Wildhaber | 51/287 |
| 2,711,673 | 6/1955 | Miller | 51/26 |
| 2,996,847 | 8/1961 | Saari | 51/26 |
| 3,813,821 | 6/1974 | Takahashi | 51/26 |

FOREIGN PATENT DOCUMENTS

| | | |
|---|---|---|
| 3314453 | 10/1984 | Fed. Rep. of Germany . |
| 3616175 | 1/1987 | Fed. Rep. of Germany . |
| 199643 | 8/1967 | U.S.S.R. . |
| 356112 | 7/1972 | U.S.S.R. . |

OTHER PUBLICATIONS

Technologia I Kachestvo Zubchatykh I Chervyachnykh Peredach, Erevan, Dec. 1971.
Technologia Mekhanicheskoi Obrabotki I Sborki V Pretsizionnom Stankostroenii, "Maschinostroenie", M., 3-1970.
Zuboobrabatyvajuschie Stanki I Instrumenty V Priborostroenii, 3-1963.

*Primary Examiner*—Robert A. Rose
*Attorney, Agent, or Firm*—Ladas & Parry

[57] ABSTRACT

A method for manufacture of a toothed abrasive tool mating with the machining gear wheel (2) from a flat abrasive wheel (1) comprising axial feed of the flat abrasive wheel (1) and delivery of free abrasive material into the contact zone, and a method for finish machining with said tool of a gear wheel (2) comprising replacement of the free abrasive material by the cutting fluid and replacing the axial feed of the abrasive wheel (1) at the final stage of tool manufacture by the tangential feed of the gear wheel (2).

4 Claims, 5 Drawing Sheets

METHOD FOR MANUFACTURE OF TOOTHED ABRASIVE TOOL AND METHOD FOR FINISH-MACHINING THEREWITH

TECNICAL FIELD

The invention relates to machine building and, more particularly, to the methods for manufacture of toothed abrasive tools and to the methods for finish-machining therewith. It can be utilized, for example, for the manufacture of tools and finish-machining of bevel and hypoid gear pairs with straight or circular teeth.

BACKGROUND OF THE INVENTION

The current methods for the manufacture of toothed abrasive tools (Technology of machining and assembly in precision machine building. 1976 "Mashinostroyeniye", Moscow, p. 210-214) consist in hot or cold moulding of an abrasive mass with a bond in a special metal or plastic press mould serving as a tool counterform. However, the need for special complicated dies, particularly for the abrasive tools in the form of a bevel gear wheel with circular teeth raises considerably the amount of labour and expenditures for their manufacture thus hampering wide introduction into industry of finish-machining of bevel gears with such tools. Besides, the abrasive tool moulded in this way calls for subsequent finishing of teeth with diamond tools to improve conjugation of the tool teeth with the teeth of the work, to increase accuracy and open the cutting drains.

There is another known method for the manufacture of toothed abrasive tools (SU, A, 356112). According to this method the diamond shaver in the form of a gear wheel is machined with a similar shaver having a considerably larger number of teeth by mutual generation in engagement and by forced rotation of both tools at a preset speed ratio. In the course of generation the contact zone of their teeth is fed with free abrasive. This method is used predominantly for dressing already manufactured toothed tools and cannot be used for moulding a toothed abrasive tool from a whole blank. Besides, the dressing tool and the tool being dressed have too meet stringent demands regarding the characteristic and amount of abrasive which limits the application of this method.

The method for making, shaped abrasive tools (DE, A 1. 3314453) approaches most closely the one disclosed herein. In this method machining is done with a profile tool of the shape contrary to that of the abrasive tool being machined. The machining tool is set with relation to the work being profiled with a certain clearance into which free abrasive is fed. The profiling tool rotates the work being profiled by means of the grains of free abrasive located between the two. Such kinematics of mutual rotation results in inevitable slipping of the abrasive work being profilled relative to the profiling tool. For this reason this method is suitable for shaping the working surfaces whose generatrix is parallel to the generatrix of the blank or is set at a small angle thereto as is the case when dressing worm abrasive wheels for grinding spur gear wheels. (N. P. Sobolev et al. Tooth-machining machines and tools and instrument building industry, 1963, "Mashgiz", Moscow-Leningrad, p. 239). The manufacture of abrasive tool in the form of a bevel gear wheel with circular teeth, i.e. a hone, is impossible in this method because the generatrix of the tooth being shaped is set at a large angle to the generating surface on which the gear rim is shaped. Therefore, when the free abrasive grains roll over the surface of the abrasive blank the way the balls roll in the ball bearing, the teeth being shaped on said blank are inevitable bound to be cut off.

In another method for finish-machining of gear wheels (SU, A, 199643) each of the mating gear wheels of the working pair is machined with a toothed tool of its own, whose cutting edges are arranged over the surface determined with the provision that the wheel being machined meshes with the machining wheel, the later being set with a hypoid offset with relation to the wheel being machined. In view of the fact that mating of the machining surface of the tooth with the surface being machined is achieved by approximate methods, the existing methods of tooth forming, e.g. on metal-working equipment produce the working surface of the tool tooth which only approaches the complete mating with the surface of the tooth of the wheel being machined. Therefore, such a tool does not have the requisite accuracy characteristics permitting various kinds of gear wheels to be machined with a high precision. Besides, separate manufacture of abrasive tools and separate machining therewith of each of the mating wheels in a pair reduces the efficiency of both tool manufacture and finish machining.

SUMMARY OF THE INVENTION

The object of the present invention lies in providing a method for manufacture of toothed abrasive tools and a method for finish machining therewith which would ensure high-precision machining of all kinds of gear wheels by virtue of mutual slipping of the machining surface and the surface being machined.

This object is attained by providing a method for the manufacture of toothed tools comprising feeding the machining gear wheel axially in contact with the blank of the toothed abrasive tool then rotating them, at the same time delivering free abrasive material into the zone of their contact wherein, according to the invention, the blank for the toothed abrasive tool is constituted by a flat abrasive wheel while the machining gear wheel is set relative to said flat wheel so that the axes of the machining wheel and flat abrasive wheel are intersecting straight lines so that the flat abrasive wheel and the gear wheel form a hypoid pair.

This allows all kinds of gear wheels to be machined with a high degree of precision irrespective of the shape of their teeth and the material they are made of.

It is expedient that the number of teeth of the gear rim being shaped should be selected so that the ratio of the number of teeth of the toothed abrasive tool being shaped to the number of teeth of the machining wheel would be an irrational number.

This will improve considerably the accuracy of manufacture of the toothed abrasive tool and the precision of machining the gear wheels with said tool.

On the other side of the centre line of the abrasive wheel it is possible to install an additional gear wheel conjugate to the first one for making an additional gear rim concentric on the first rim.

This increases substantially the manufacturing efficiency of toothed abrasive tools.

When at least one gear rim is already formed on the flat abrasive wheel it is practicable that the free abrasive material ceases to be fed into the zone of contact between the machining gear wheel and the toothed abrasive tool then at least one gear wheel is fed tangentially with simultaneously delivery of the cutting fluid into the contact zone until finish-machining of the gear wheel is completed.

This improves considerably the efficiency of finish-machining of gear wheels by dispensing with the time taken for setting up the process and by simultaneous machining of both elements of the gear pair with a single abrasive tool.

BRIEF DESCRIPTION OF THE DRAWINGS

Now the invention will described in detail by way of examples with reference to the accompanying drawings in which.

BEST MODE OF CARRYING OUT THE INVENTION

Figure 1:
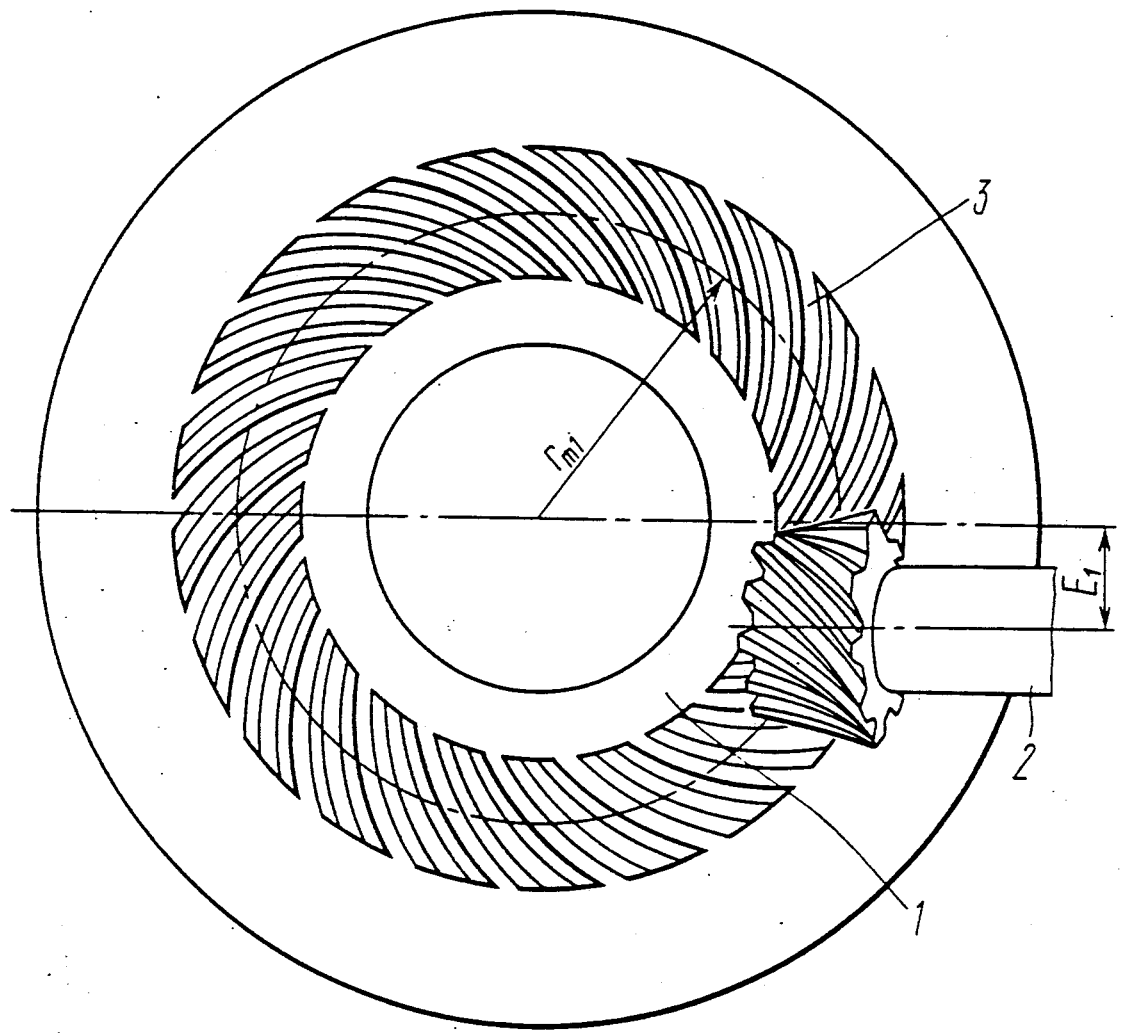
FIG. 1 is a schematic diagram of the relative arrangement of the flat abrasive wheel and the toothed element according to the invention.
Figure 2:
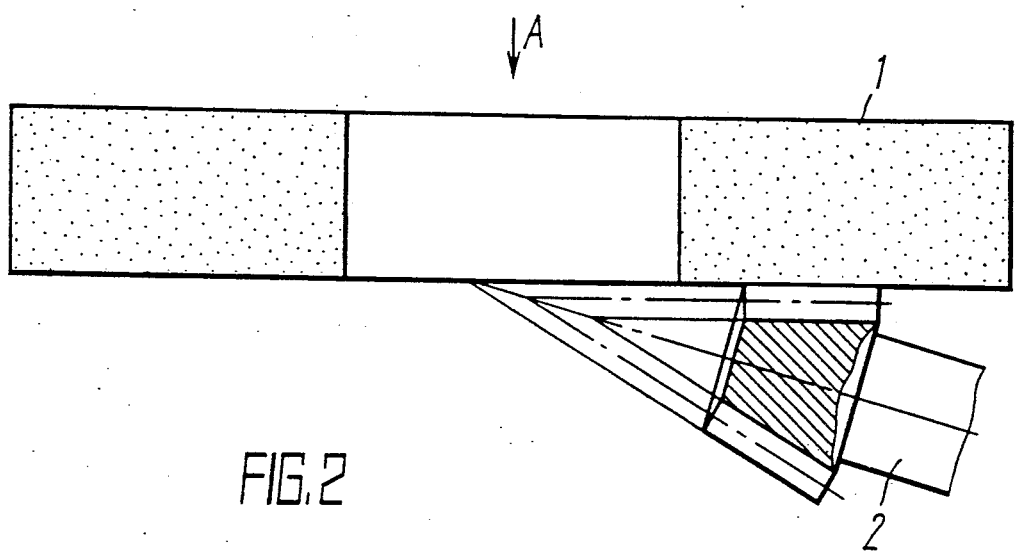
FIG. 2 is the initial stage of forming the gear rim.

The claimed method for manufacture of toothed abrasive tool consists in the following. Before beginning the manufacture of the toothed abrasive tool from a flat abrasive wheel 1 (FIG. 1) with the machining wheel 2 it is necessary to determine the geometrical dimensions of the gear rim 3 mating with the gear wheel 2. The requirement of mating with the gear wheel 2 is met in the best manner by the theoretical flat reproducing wheel. Then any well-known method is used to determine the number of teeth of the flat reproducing wheel. Then it is rounded off to the nearest whole number at which the ratio of the numbers of teeth of the abrasive gear rim 3 and of machining gear wheel 2 is expressed, say, by an irrational number. Then the mean indexing radius R and the hypoid distance E of the toothed abrasive rim 3 relative to the machining gear wheel 2 are determined. Installed in these relative positions are the flat abrasive wheel 1 (FIG. 2) and the machining gear wheel 2 so that the tooth points of the machining wheel 2 contact the face surface of the flat abrasive wheel 1. Then positive synchronous rotation is imparted to the wheel 1 and gear wheel 2 in accordance with the obtained ratio of their tooth numbers, the free abrasive material is delivered into the tooth contact zone of the machining wheel 2 and abrasive wheel 1, and the abrasive wheel 1 is fed in the direction of arrow A.

When the free abrasive grains penetrate between the teeth of gear wheel 2 and abrasive wheel 1, contact stresses are originated in their interaction zone. As distinct from the steel gear wheel 2 with a homogeneous structure, the abrasive wheel 1 is composed of materials of heterogeneous mechanical properties. When the abrasive wheel 1 is being machined by the contacting steel gear wheel 2 with the delivery of free abrasive material into the zone of contact there may arise two situations.

The free abrasive grains get in between the machining surface the steel gear wheel 2 and the bond of the abrasive wheel 1. Under the pressure of the tooth of wheel 2 the free abrasive grains penetrate into the bond, chipping out the abrasive grains of the wheel 1.

The free abrasive grains get in between the machining surface of the tooth of the steel wheel 2 and the grains of the abrasive wheel 1. In this case the very hard grain of free abrasive penetrates somewhat into the less hard tooth of the steel wheel 2, is entrained by the latter and, due to the relative slipping of the machining surface and the surface being machined, is shifted onto the bond and is implanted into it, chipping out the abrasive grains from the wheel 1.

Figure 3:
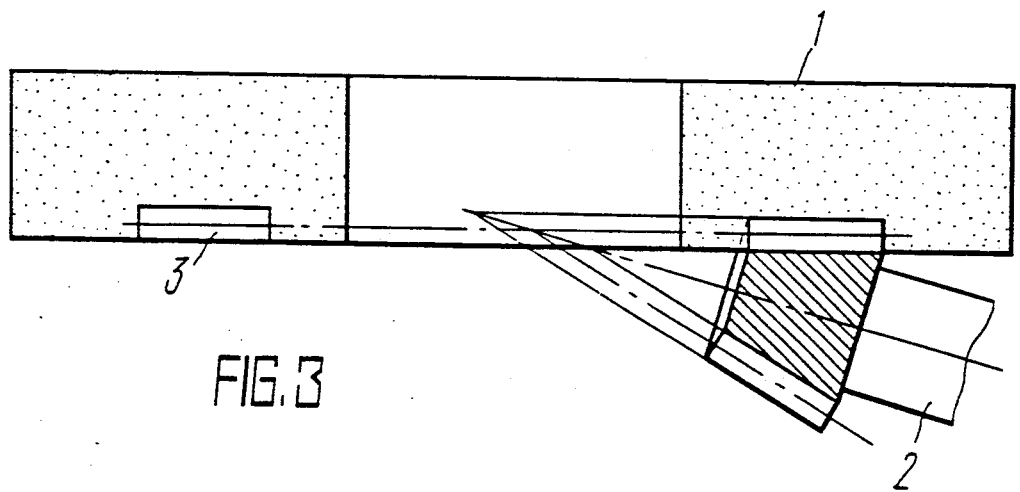
FIG. 3 is the final stage of forming the gear rim.

As the grains of the abrasive wheel 1 (FIG. 3) are gradually chipped out, the teeth of the machining wheel 2 penetrate deeper and deeper into the abrasive wheel 1, forming a gear rim 3 on it the teeth of said rim having a profile mutually enveloping the profile of teeth of the machining wheel 2. This process continues until the total depth of the tooth of the rim 3 is formed on the abrasive wheel 1.

The irrational number expressing the ratio of the numbers of teeth of the gear rim 3 being machined and the machining gear wheel 2 permits said machining wheel 2 to be used even if its accuracy characteristics are unsatisfactory, such as, for example, the difference in the pitches of adjacent teeth. In case of an irrational speed ratio the errors in the adjacent pitches of the teeth of the machining wheel 2 are not reproduced on the gear rim 3 of the tool being shaped but are redistributed thereon, ensuring a high accuracy of adjacent pitches of the teeth of rim 3.

Figure 4:
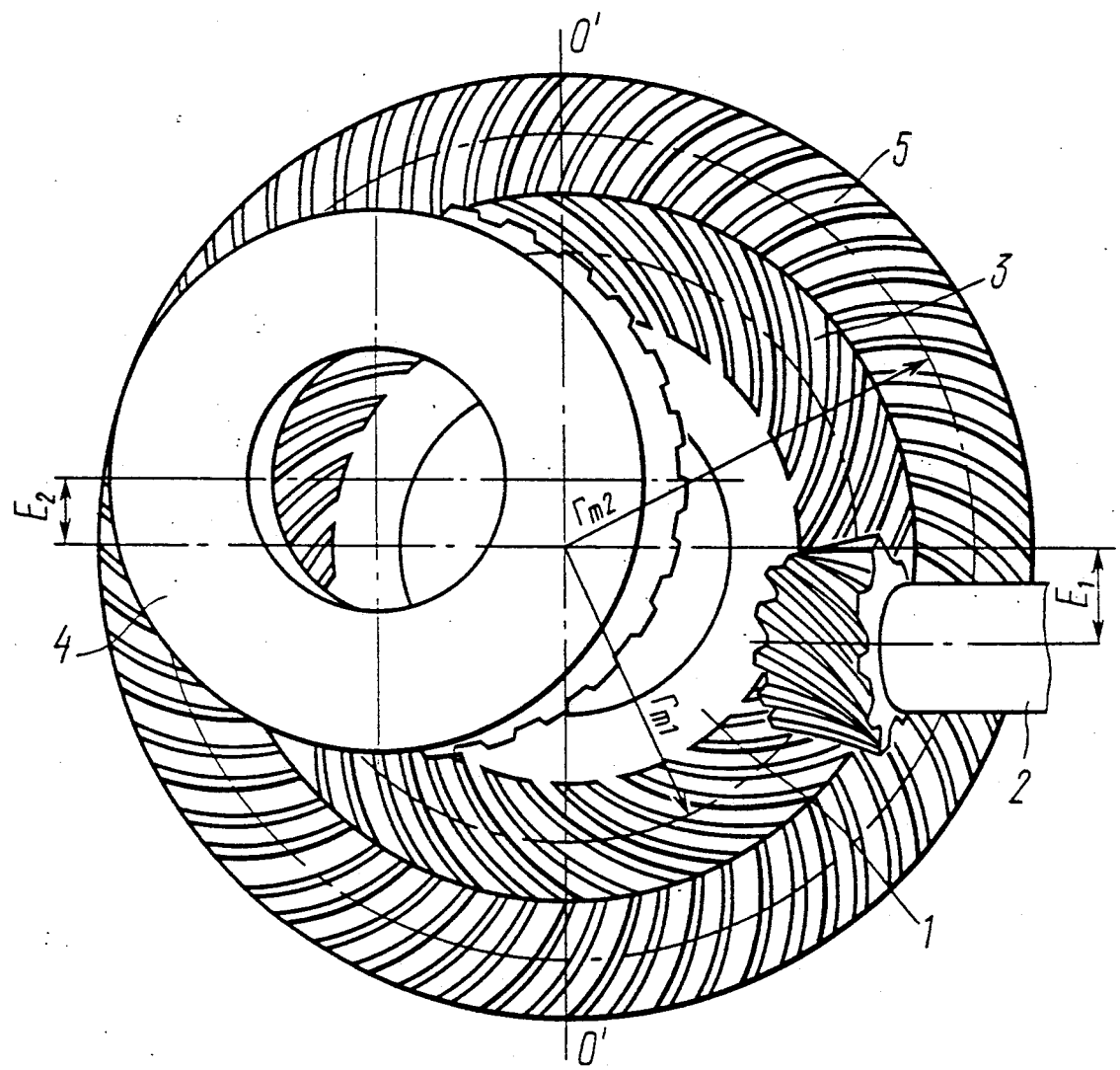
FIG. 4 shows the relative arrangement of the abrasive wheel and mating gear wheels.
Figure 5:
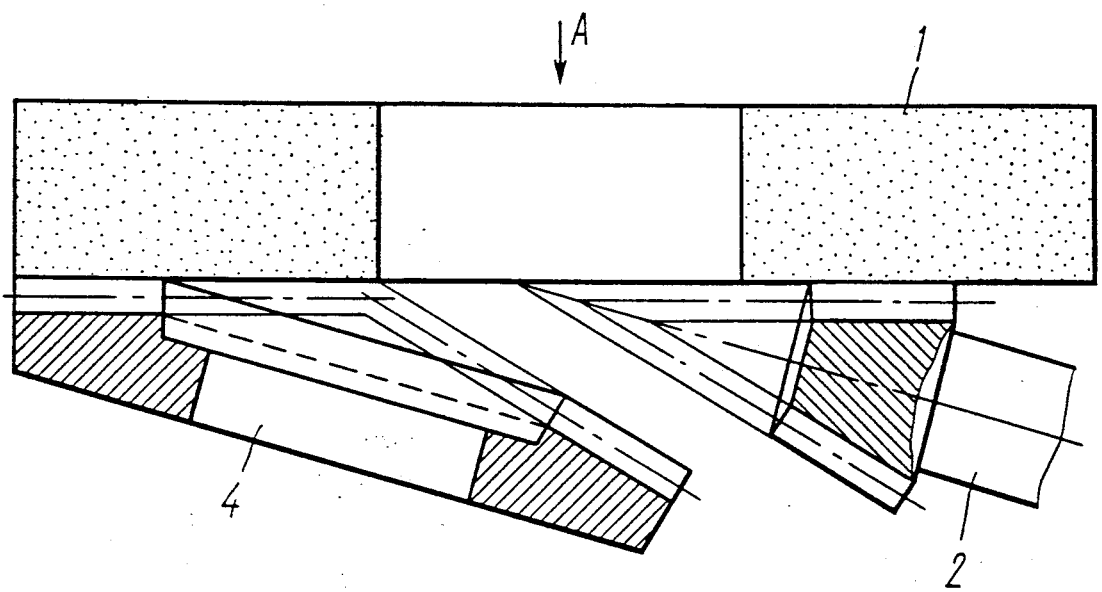
FIGS. 5 and 6 illustrate, respectively, the initial and final stages of forming two gear rims on the abrasive wheel.
Figure 6:
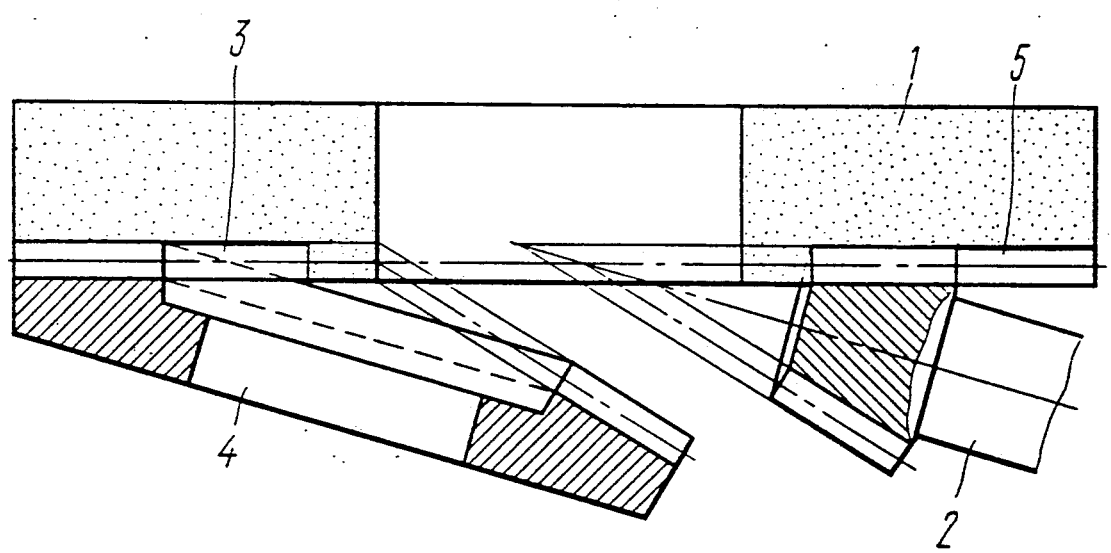

Installed on the other side of the centre line $0'$—$0'$ (FIG. 4) of the flat abrasive wheel 1 in their relative positions $r_{m\ 2}$ and $E_2$ is an additional machining gear wheel 4 mating with the wheel 2, then said machining wheels 2 and 4 are set in positive synchronous rotation at a speed ratio equal to the product of the determined speed ratios of wheels 2 and 4 and the gear rims of wheel 1 being formed, the working feed is directed along arrow A (FIG. 5), then free abrasive material is fed into the contact zone of the teeth of machining wheels 2 and 4 with the flat abrasive wheel 1 so that two gear rims 3 and 5 (FIG. 6) are simultaneously formed on the wheel 1, the teeth of said rims 3 and 5 having a profile mutually enveloping with the profile of teeth of the machining wheels 2 and 4, respectively. The process of machining continues just as in the formation of a single rim, to the point of forming the total depth of teeth of the gear rims 3 and 5.

The relative positions $r_{m\ 2}$ and $E_2$ (FIG. 4) occupied by the additional gear wheel 4 and the geometrical dimensions of the additional gear rim 5 on the flat abrasive wheel 1 are determined just as are the dimensions of the gear rim 3. The possibility of selecting the geometrical dimensions of the gear rim 5 mating with the gear wheel 4 offers a possibility of selecting the best variant of the relative arrangement, for example concentric, of two gear rims 3 and 5 on the flat abrasive wheel 1.

Figure 7:
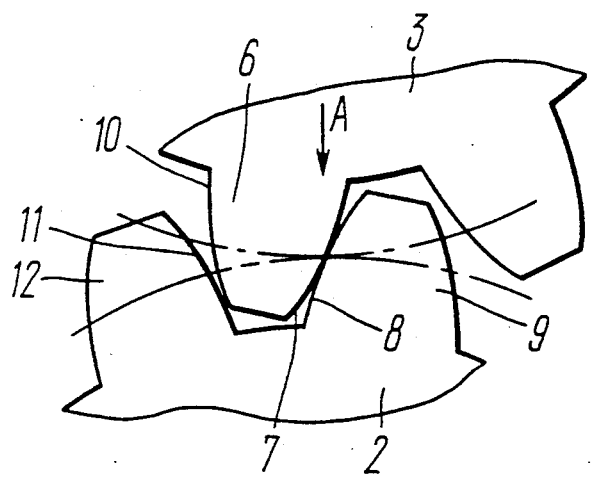
FIG. 7 shows the relative arrangement of teeth of the toothed abrasive tool and gear wheel being machined while forming the gear rim of the tool.

The synchronous rotation of the pair of machining gear wheels 2 and 4 rotating at a preset speed ratio and their arrangement on both sides of the centre line $0'$—$0'$ of the wheel 1 prevents slipping of the free-rotating wheel 1 with relation to the machining wheels 2 and 4. Owing to this, the teeth of the machining wheels 2 and 4 are in a two-profile engagement with the teeth of gear rims 3 and 5 formed on the wheel 1. In the two-profile engagement the flank 7 of the tooth 6 (FIG. 7) of the gear rim 3 is in contact with the flank 8 of the tooth 9 of the gear wheel 2 and, simultaneously, its flank 10 is in contact with the flank 11 of the tooth 12 of the gear wheel 2. The two-profile engagement permits producing the toothed abrasive tool with the gear rims 3 and 5 (FIG. 6) having theoretically correct engagement with the teeth of the gear wheels 2 and 4, respectively. This engagement is impossible to achieve when manufacturing the toothed abrasive tool by the existing methods.

Figure 8:
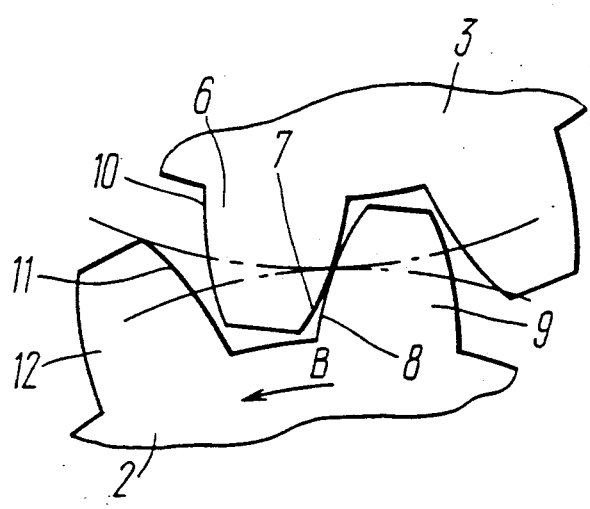
FIG. 8 shows the relative arrangement of teeth of the toothed abrasive tool and of the gear wheel being machined during finish machining.

On completion of forming the total depth of teeth of one rim for example, the rim 3 of the wheel 1, the axial feed and the delivery of free abrasive material into the tooth contact zone between the rim 3 and the teeth of at least one gear wheel, e.g. are discontinued. Then the gear wheel 2 is fed tangentially, i.e. the rotation speed of the gear wheel 2 is momentarily increased, for example in the direction of arrow B (FIG. 8) after which the gear wheel 2 and the flat abrasive wheel 1 with the gear rim 3 continue to be synchronously and positively rotated and the cutting fluid is delivered into the zone of contact of their teeth. When the tangential feed is thrown in the direction of arrow B (FIG. 8), the resilient deformations of the surfaces 7 and 8 of the teeth 6 and 9, respectively, create a clearance between the surfaces 10 and 11 of the teeth 6 and 12, respectively. Thus, the two-profile engagement of the gear rim 3 with the gear rim 2 acquires a single-profile nature. The abrasive grains constituting the body of the tooth 6 together with the bond finish-machine the surface 8 of the tooth 9 of the gear wheel 2 due to relative slipping of the surfaces 7 and 8. The cutting fluid washes out the products of cutting and wear of abrasive grains from the zone of engagement of surfaces 7 and 8 of teeth 6 and 9, respectively.

After the removal of the layer of metal required for finish machining from the surface 8 of the tooth 9, the gear wheel 2 is fed tangentially in the direction contrary to arrow B and the surface 11 of the tooth 12 of the wheel 2 is similarly machined by the abrasive surface 10 of the tooth 6 of the gear rim 3.

The gear rim 3 can machine a considerably greater number of gear wheels 2 one of which has formed the gear rim 3 than can the traditional tools. Owing to the fact that the teeth of the rim 3 and wheel 2 are in theoretically correct engagement and both these elements are in positive synchronous rotation at a preset speed ratio which is strictly equal to the ratio of their tooth numbers, the removal of metal from the surface 8 of the tooth 9 of the wheel 2 and wear of the tooth 6 of the gear rim 3 will be most uniform. The inevitable gradual distortion of the surfaces 7 and 10 of the tooth 6 of the gear rim 3, can be instantly remedied by dressing for which purpose during the tangential feed the zone of engagement of the teeth of the rim 3 and wheel 2 is fed not with the cutting fluid but with the free abrasive material until the correct theoretical engagement is restored. The gear wheel 2 can be machined with periodical dressing of the rim 3 with the same gear wheel 3 until the point of the tooth 6 of the rim 3 becomes sharper. The total thickness of the tooth 6 is restored by axial feed of the flat abrasive wheel 1 in the direction of arrow A (FIG. 2) and by the delivery of free abrasive material into the contact zone of the teeth of gear rim 3 (FIG. 3) and gear wheel 2.

Thus, in the course of dressing of the gear rim 3 (FIGS. 7 and 8), the replacement alone of the free abrasive material delivered into the contact zone of the teeth of gear rim 3 and gear wheel 2 by the cutting fluid transforms the machining surface 7 of the tooth 6 of the gear rim 3 into the surface which is being machined. This peculiarity of the method for manufacture of the toothed abrasive tools and the method of finish machining therewith in combination with the ratio of the number of teeth of the gear rim 3 and gear wheel 2 expressed in an irrational number permits producing the so called "master wheels" utilized, for example, in instrument engineering, precision machine-building and in the capacity of precision reference standards.

Simultaneous machining of two gear wheels 2 and 4 (FIG. 6) making up a mating gear pair with a toothed abrasive tool having two concentric gear rims 3 and 5 proceeds quite identically with the machining of a single gear wheel 2. The gear wheel 2 or 4 is fed tangentially and the cutting fluid is delivered into the tooth contact zone of the gear rims 3 and 5 with the teeth of wheels 2 and 4.

INDUSTRIAL APPLICABILITY

The claimed method for manufacture of a toothed abrasive tool for machining gear wheels can be realized on a relatively simple equipment. An important of this method in comparison with the existing ones lies in that the blanks for making a toothed abrasive tool are constituted by standard flat abrasive wheels. The disclosed method can be utilized for shaping toothed tools with the teeth whose longitudinal shape, e.g. spiroid, eloid and other teeth, denies the possibility of making them by the currently existing methods. The toothed tool manufactured by the claimed method complies with the individual peculiarities of the tooth geometry of a particular lot of gear wheels machined by said tool.

The claimed method is highly efficient. The total time of manufacture of a toothed abrasive tool from a flat abrasive wheel is about 25-30 min against 24-36 h in traditional methods. High efficiency of the method is combined with a cheap set of toothed machining elements which are constituted by an ordinary pair of gear wheels. More than that, the rough shaping of the toothed abrasive tool can be carried out by the gear wheels which are nonstandard in some respects, for example with erroneous adjacent pitches.

The disclosed method for finish-machining with a toothed abrasive tool manufactured by the disclosed method, said tool being periodically dressed with the gear wheel being machined can be used for manufacturing "master wheels" which are extremely difficult to make by the existing finish-machining methods.

The efficiency of the disclosed method for machining gear wheels is several times higher than that of the currently existing methods.

We claim:

1. A method for the manufacture of a toothed abrasive tool with a machinable end face with the aid of a machining gear wheel comprising:
   a) providing a blank used for producing said toothed abrasive tool, said blank being a flat abrasive wheel having an axis of rotation;
   b) providing a machining gear wheel for the manufacture of said abrasive tool, said machining gear being a bevel gear to be further finish machined, having axis of rotation of its own;

c) installing said machining gear wheel relative to said flat abrasive wheel such that their axes of rotation are substantially intersecting straight lines arranged relative to one another at a hypoid distance so that said abrasive wheel and said machining gear wheel make up a hypoid pair;

d) installing tip surfaces of teeth of said machining gear wheel tangentially to the end face of said flat abrasive wheel;

e) feeding said flat abrasive wheel along its axis in the direction toward said machining gear wheel;

f) bringing said flat abrasive wheel and said machining gear wheel to forced mutual rotation;

g) feeding free abrasive material to the contact zone of teeth of said machining wheel and the end face of said abrasive wheel for removing the bonded abrasive material from spaces by tearing out the abrasive grains from the bond to form a gear rim on said end face of the abrasive wheel;

h) continuing feeding of the abrasive wheel along its axis, said forced mutual rotation of the abrasive wheel and machining gear wheel and said feed of a free abrasive material to the contact zone of said surface of the wheel and teeth of the machining wheel to finally form at least one said gear rim on said flat abrasive wheel.

2. The method according to claim 1 wherein the ratio of the number of teeth of said formed gear rim on said end face of said abrasive wheel to the number of teeth of said machining gear wheel is an irrational number.

3. The method according to claim 1 wherein for purposes of forming an additional gear rim on said flat abrasive wheel that is concentric to said first gear rim, an additional machining gear wheel is mounted on the other side from the center plane of said flat abrasive wheel that is opposite to one on which said machining gear wheel is installed and is subject to further finish machining and has its own axis of rotation; said machining gear wheel and additional machining gear wheel together make up a bevel or hypoid pair; said additional machining gear wheel is installed relative to said flat abrasive wheel such that their axes are substantially intersecting straight lines arranged one from another at a hypoid distance, and said abrasive wheel and said additional machining gear wheel making up a hypoid pair.

4. A method of finish machining a gear wheel with a toothed abrasive tool comprising manufacturing a toothed abrasive tool with the aid of a machining gear wheel according to the following steps:

a) providing a blank used for producing said toothed abrasive tool, said blank being a flat abrasive wheel having an axis of rotation of its own;

b) providing a machining gear wheel used for manufacturing said abrasive tool, said machining gear being a bevel gear wheel subject to further finish machining and having an axis of rotation of its own;

c) installing said machining gear wheel relative to said flat abrasive wheel such that their axes of rotation are substantially intersecting straight lines arranged with respect to one another at a hypoid distance so that said abrasive wheel and said machining gear wheel make up a hypoid pair;

d) installing the tip surfaces of teeth of said machining gear wheel in tangent to the end face of said flat abrasive wheel;

e) feeding said flat abrasive wheel along its axis toward said machining gear wheel;

f) bringing said flat abrasive wheel and said machining gear wheel to forced mutual rotation;

g) feeding a free abrasive material to the contact zone of teeth of said machining gear wheel and the end face of said flat abrasive wheel;

h) feeding the abrasive wheel along its axis, mutual rotation of the abrasive wheel and the machining gear wheel and feeding of a free abrasive material to the contact zone of said surface of the abrasive wheel and teeth of the machining wheel are continued to finally form at least one gear rim on said end face of the flat abrasive wheel;

i) upon the completion of formation on said end face of said abrasive wheel of at least one gear rim, said feeding of a free abrasive material, said positive rotation of said hypoid pair and said feeding of said abrasive wheel are terminated;

j) disengaging said machining gear wheel from said gear rim on the end face of said abrasive wheel;

k) mounting a machinable gear wheel to be further finish machined in place of said machining gear wheel;

l) meshing said machinable gear wheel with said gear rim on the end face of said abrasive wheel;

m) bringing said abrasive wheel with at least one gear rim formed thereon, and said machinable gear wheel to forced mutual rotation;

n) feeding a cooling lubricant to the contact zone of teeth of said machinable gear wheel and said gear rim;

o) imparting said machinable gear wheel with a tangential feed;

p) upon the completion of machining one tooth flank of said machinable gear wheel, the direction of said tangential feed of said machinable gear wheel is reversed, and the other lateral surface of the tooth is machined in a similar way;

q) said tangential feed, said positive rotation and said feed of a cooling lubricant are continued till completion of the finish machining of said machinable gear wheel by using said gear rim of the abrasive tool.

* * * * *